J. R. GREEN.
STEEL COMBINATION RAILROAD TIE.
APPLICATION FILED OCT. 16, 1909.
Reissued Mar. 1, 1910.
13,085.
2 SHEETS—SHEET 1.
Fig. 1.
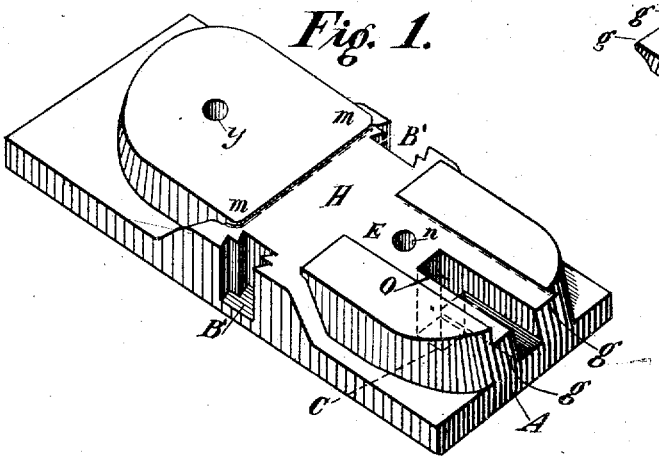
Fig. 3.
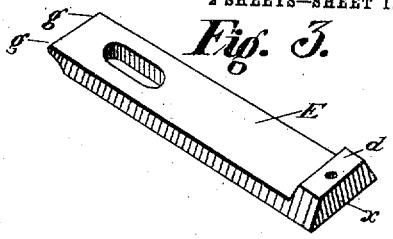
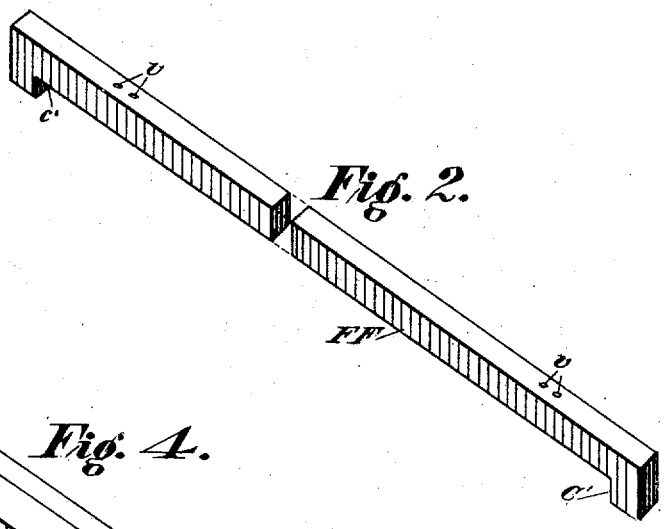
Fig. 2.
Fig. 4.
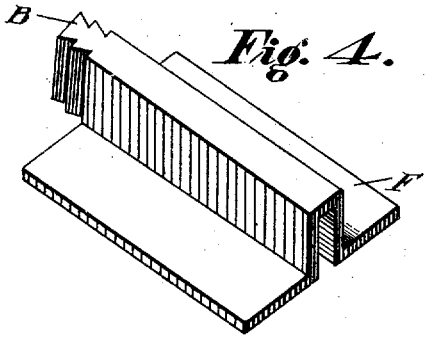
Fig. 4.1
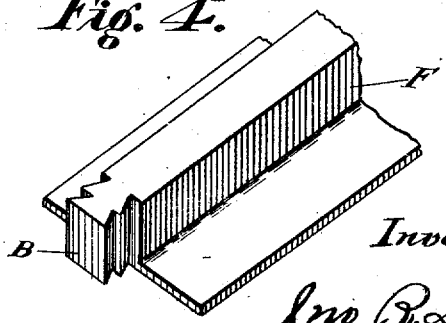
Witnesses:
John E. Hamilton,
William J. Turner
Inventor:
Jno R. Green
ANDREW B. GRAHAM CO., PHOTO-LITHOGRAPHERS, WASHINGTON, D. C.

J. R. GREEN.

STEEL COMBINATION RAILROAD TIE.

APPLICATION FILED OCT. 16, 1909.

Reissued Mar. 1, 1910.

13,085.

2 SHEETS—SHEET 2.

Witnesses:
John E. Hamilton,
William J. Turner

Inventor:
Jno R. Green

ANDREW B. GRAHAM CO., PHOTO-LITHOGRAPHERS, WASHINGTON, D. C.

UNITED STATES PATENT OFFICE.

JOHN R. GREEN, OF WOODSTOCK, ALABAMA.

STEEL COMBINATION RAILROAD-TIE.

13,085. Specification of Reissued Letters Patent. Reissued Mar. 1, 1910.

Original No. 527,682, dated October 16, 1894, Serial No. 377,679. Application for reissue filed October 16, 1909. Serial No. 523,250.

*To all whom it may concern:*

Be it known that I, JOHN R. GREEN, a citizen of the United States, residing at Woodstock, in the county of Bibb and State of Alabama, have invented a Steel Combination Railroad-Tie, for which I desire to secure Letters Patent in the United States, of which the following is a specification.

My invention relates to metallic combination rail-road ties, in which "tie bars" and "rail-supports" are joined to "rail-sleepers," and secured in position by "slot hole keys," and bolts operated in conjunction with the rails; and the object of my invention is, first, to provide a continuous "rail bearing" with facilities for proper adjustment in making curves; second, to afford a safe device for securely holding the rails, independent of spikes or wedges. These objects I attain by the mechanism illustrated in my drawings.

Figure 8:
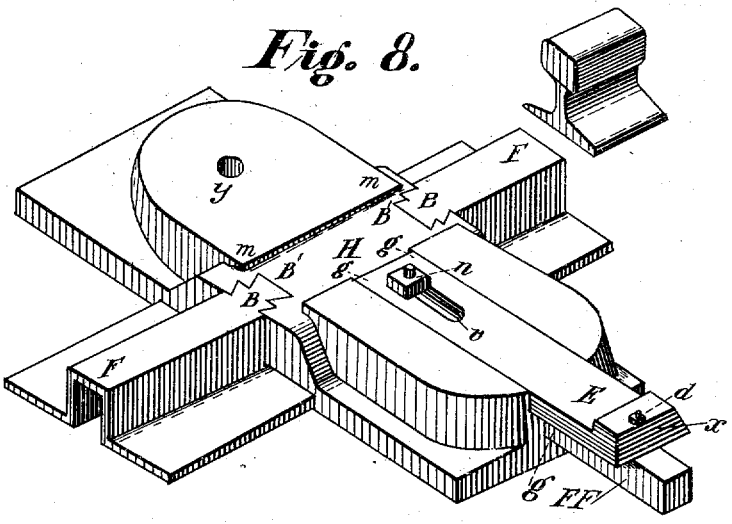
Figure 6:
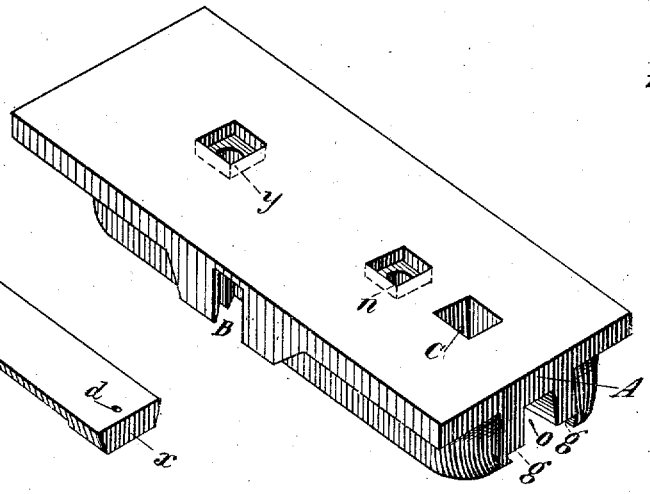
Figure 7:
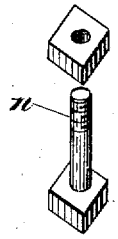
Figure 5:
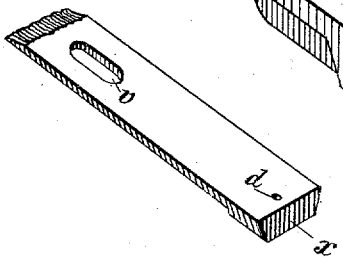

Figure 1, in my drawings is a perspective view of one section of the sectional rail sleeper as it appears after the removal of all connecting parts; Fig. 2, the tie bar with the turned down ends, for the purpose of connecting the sectional rail sleepers. Fig. 3, is a perspective view, of the slot hole key or cover plate, which enters key seat E in Fig. 1, Figs. 4 and 4′ are perspective views of the rail supports and tie braces. Fig. 5, is the reverse side of Fig. 3. Fig. 6, is the reverse side of Fig. 1, which may be flat and solid, or hollowed out as desired; Fig. 7, bolt for hole *n*, in Fig. 1. Fig. 8, is a view of the parts in place ready to receive the rail.

The sectional "rail sleeper" shown in Fig. 1, is coupled to its duplicate section by the "tie bar" shown in Fig. 2, which lies directly across the road bed, in the same position as that of a wood tie. Each end of the tie bar *c′*, and *c′*, shown in Fig. 2, enters the groove *o* and mortise *c*, in the end of each section of the "rail sleepers" shown in Fig. 1. The ends B of the rail supports shown in Fig. 4, drop into the dovetail notches B′ on each side edge, of the "rail sleepers" shown in Fig. 1, the rail lying lengthwise on top of the "rail supports" shown in Fig. 4, and directly across the "rail sleepers" in seat H, shown in Fig. 1, with the outside flange of the rail under the lip *m*, *m*, on top of "rail sleeper." The end *g*, *g*, of "slot hole key" shown in Fig. 3, enters end *g*, *g*, of key seat E, and is driven up on top of "tie bar" shown in Fig. 2, until it is tight on top of the inside flange of the rail—then by passing the bolt shown in Fig. 7, up through hole *n*, in the "rail sleeper" shown in Fig. 1, and on through the "slot hole key" shown in Fig. 3, and the nut being wrenched down tight on the bolt shown in Fig. 7, secures together my "combination tie" all parts of which may be made of steel, and the several parts being dependent upon each other mutually contribute to produce the combination claimed, and the slipping and sliding, usual to other ties are consequently prevented.

The hole, *y*, in outside end of "rail sleeper" shown in Fig. 1, is to receive a bolt only when the tie is laid on a bridge or trestle.

It will be noted that the mortise *c* is longer than the tenon *c′*, which permits expansion and contraction of the tie bar F.

What I do claim as my invention and desire to secure by Letters Patent is—

1. The combination with a metallic rail-road tie of a sectional rail sleeper, said tie having a groove *o*, a mortise, *c*, a key seat E, a rail seat H, a flange lip, *m*, *m*, two rail support notches, B and B, and having bolt holes, *n* and *y*, all substantially as set forth.

2. The combination with the tie having the mortise and groove with the tie bar, having the turned down ends fitting therein of the cover plate, E, for the purpose herein set forth.

3. The combination in a metallic rail-road tie of a "rail support" having dove-tail notches on each end B, and B, adjustable in dove-tail notches B′, B′, on "rail sleepers" adapted to proper curvature of road, and solid rail bearing, and to prevent rail sleepers from slipping and sliding, all as substantially set forth.

4. The combination in a metallic railroad tie, of a rail support for each rail, having a groove and a mortise adapted to receive a tie bar, the tie bar being provided with a tenon to engage said mortise, the mortise being longer than the tenon, to permit expansion and contraction of the tie bar, and a cover plate for said groove, as set forth.

JNO. R. GREEN.

Witnesses:

JNO. E. HAMILTON,
WILLIAM J. TURNER.